(12) United States Patent
Lu et al.

(10) Patent No.: US 12,164,327 B2
(45) Date of Patent: Dec. 10, 2024

(54) GLITCH-FREE CLOCK SWITCHING CIRCUIT WITH CLOCK LOSS TOLERANCE AND OPERATION METHOD THEREOF AND GLITCH-FREE CLOCK SWITCHING DEVICE

(71) Applicant: Artery Technology Company, Hsinchu (TW)

(72) Inventors: Shih-Chuan Lu, Hsinchu (TW); Dianying Li, Henan (CN)

(73) Assignee: Artery Technology Company, Hsinchu (TW)

( * ) Notice: Subject to any disclaimer, the term of this patent is extended or adjusted under 35 U.S.C. 154(b) by 204 days.

(21) Appl. No.: 17/896,084

(22) Filed: Aug. 26, 2022

(65) Prior Publication Data
US 2023/0341891 A1    Oct. 26, 2023

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ............ G06F 1/12; G06F 1/08; H03K 5/1252
See application file for complete search history.

(56) References Cited

U.S. PATENT DOCUMENTS

| | | | |
|---|---|---|---|
| 8,350,596 B1* | 1/2013 | Soh | H03K 19/00346 327/20 |
| 9,207,704 B2 | 12/2015 | Anker | |
| 9,612,611 B1* | 4/2017 | Nakibly | G06F 1/04 |
| 2013/0043905 A1* | 2/2013 | Langadi | H03K 5/19 326/93 |
| 2016/0041578 A1 | 2/2016 | Lee | |
| 2019/0356313 A1* | 11/2019 | Venugopal | H03K 3/0375 |
| 2021/0382519 A1* | 12/2021 | Chang | G06F 1/12 |

FOREIGN PATENT DOCUMENTS

| | | |
|---|---|---|
| CN | 101526829 A | 9/2009 |
| CN | 103546125 A | 1/2014 |
| TW | 200843344 | 11/2008 |

* cited by examiner

*Primary Examiner* — Hyun Soo Kim

(74) *Attorney, Agent, or Firm* — WPAT, P.C.; Anthony King

(57) ABSTRACT

A glitch-free clock switching circuit with clock loss tolerance and an operation method thereof and a corresponding glitch-free clock switching device are provided. The glitch-free clock switching circuit includes a first and a second stuck-status detection circuits, a first and a second reset synchronizers and a glitch-free switching core circuit. The glitch-free switching core circuit performs clock switching according to a clock switching signal to switch an output clock of the glitch-free clock switching circuit from an original clock source to a target clock source, where the original clock source and the target clock source represent one and the other of a first clock source and a second clock source, respectively; wherein the glitch-free clock switching circuit performs the clock switching based on a first synchronized reset signal and a second synchronized reset signal to provide the clock loss tolerance.

15 Claims, 10 Drawing Sheets

GLITCH-FREE CLOCK SWITCHING CIRCUIT WITH CLOCK LOSS TOLERANCE AND OPERATION METHOD THEREOF AND GLITCH-FREE CLOCK SWITCHING DEVICE

BACKGROUND OF THE INVENTION

1. Field of the Invention

The present invention relates to clock switching, and more particularly, to a glitch-free clock switching circuit with clock loss tolerance, an operation method thereof, and a corresponding glitch-free clock switching device.

2. Description of the Prior Art

According to the related art, when performing dynamic clock switching through a multiplexer, a problem of the generation of a glitch on an output clock may occur. The traditional glitch-free clock switching circuit may solve this problem, but during clock switching, two clock input terminals thereof need to have clocks, respectively. A first conventional method is proposed in the related art to try to solve this problem, but there are some limitations, such as the limitation of a select toggle rate, the limitation of an input clock ratio, etc. A second conventional method is proposed in the related art to try to solve this problem, but there are additional problems, for example, the cost is greatly increased, user programming is necessary, and the cost of programming register is necessary.

As can be seen from the above, the conventional methods listed above bring their respective side effects such as the above-mentioned limitations, the above-mentioned additional problems, etc. Thus, there is a need for a novel architecture to realize a low cost and robust glitch-free clock switching circuit without introducing side effects, or in a way that is less likely to introduce a side effect.

SUMMARY OF THE INVENTION

An object of the present invention is to provide a glitch-free clock switching circuit with clock loss tolerance, an operation method thereof, and a corresponding glitch-free clock switching device, in order to solve the above problems.

Another object of the present invention is to provide a glitch-free clock switching circuit with clock loss tolerance, an operation method thereof, and a corresponding glitch-free clock switching device, in order to realize a low cost and robust glitch-free clock switching circuit without introducing side effects, or in a way that is less likely to introduce a side effect.

At least one embodiment of the present invention provides a glitch-free clock switching circuit with clock loss tolerance, wherein the glitch-free clock switching circuit may comprise: a first stuck-status detection circuit; a first reset synchronizer, coupled to the first stuck-status detection circuit; a second stuck-status detection circuit; a second reset synchronizer, coupled to the second stuck-status detection circuit; and a glitch-free switching core circuit, coupled to the first reset synchronizer and the second reset synchronizer. For example, the first stuck-status detection circuit can be arranged to perform a plurality of first stuck-status detection operations on a first clock source according to a reference clock signal to generate a plurality of first logic signals, wherein logic values of the plurality of first logic signals represent stuck-status detection results of the plurality of first stuck-status detection operations; the first reset synchronizer can be arranged to perform at least one first logic operation on the plurality of first logic signals to output a first synchronized reset signal responsively; the second stuck-status detection circuit can be arranged to perform a plurality of second stuck-status detection operations on a second clock source according to the reference clock signal to generate a plurality of second logic signals, wherein logic values of the plurality of second logic signals represent stuck-status detection results of the plurality of second stuck-status detection operations; the second reset synchronizer can be arranged to perform at least one second logic operation on the plurality of second logic signals to output a second synchronized reset signal responsively; and the glitch-free switching core circuit can be arranged to perform clock switching according to a clock switching signal to switch an output clock of the glitch-free clock switching circuit from an original clock source to a target clock source, wherein the original clock source and the target clock source represent one of the first clock source and the second clock source and another of the first clock source and the second clock source, respectively; wherein the glitch-free clock switching circuit performs the clock switching based on the first synchronized reset signal and the second synchronized reset signal to provide the clock loss tolerance.

In addition to the above-mentioned glitch-free clock switching circuit, the present invention further provides a clock switching device (e.g., a glitch-free clock switching device) comprising the glitch-free clock switching circuit. The clock switching device may further comprise a plurality of additional glitch-free clock switching circuits, and the plurality of additional glitch-free clock switching circuits and the glitch-free clock switching circuit are coupled to each other in a cascading manner. In addition, the clock switching device is arranged to perform clock switching on a plurality of clock signals, the plurality of clock signals comprise the first clock source and the second clock source, and respective circuit architectures of the plurality of additional glitch-free clock switching circuits are the same as a circuit architecture of the glitch-free clock switching circuit.

At least one embodiment of the present invention provides an operation method of a glitch-free clock switching circuit with clock loss tolerance, wherein the operation method may comprise: utilizing a first stuck-status detection circuit in the glitch-free clock switching circuit to perform a plurality of first stuck-status detection operations on a first clock source according to a reference clock signal to generate a plurality of first logic signals, wherein logic values of the plurality of first logic signals represent stuck-status detection results of the plurality of first stuck-status detection operations; utilizing a first reset synchronizer in the glitch-free clock switching circuit to perform at least one first logic operation on the plurality of first logic signals to output a first synchronized reset signal responsively; utilizing a second stuck-status detection circuit in the glitch-free clock switching circuit to perform a plurality of second stuck-status detection operations on a second clock source according to the reference clock signal to generate a plurality of second logic signals, wherein logic values of the plurality of second logic signals represent stuck-status detection results of the plurality of second stuck-status detection operations; utilizing a second reset synchronizer in the glitch-free clock switching circuit to perform at least one second logic operation on the plurality of second logic signals to output a second synchronized reset signal responsively; and utilizing a glitch-free switching core circuit in the glitch-free clock switching circuit to perform clock switching according to a clock switching signal to switch an output clock of the glitch-free clock switching circuit from an original clock source to a target clock source, wherein the original clock source and the target clock source represent one of the first clock source and the second clock source and another of the first clock source and the second clock source, respectively; wherein the glitch-free clock switching circuit performs the clock switching based on the first synchronized reset signal and the second synchronized reset signal to provide the clock loss tolerance.

One of the advantages of the present invention is that the glitch-free clock switching circuit with the clock loss tolerance, the operation method thereof, and the corresponding clock switching device that are provided by the present invention can correctly perform the clock switching in a situation where the original clock source is lost (e.g., stops toggling or stops oscillating). In addition, the glitch-free clock switching circuit with the clock loss tolerance, the operation method thereof, and the corresponding clock switching device that are provided by the present invention can prevent various problems in the related art, such as the limitation of selecting the select toggle rate, the limitation of the input clock ratio, and some other problems, for example, the cost is greatly increased, user programming is necessary, and the cost of programming register is necessary.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
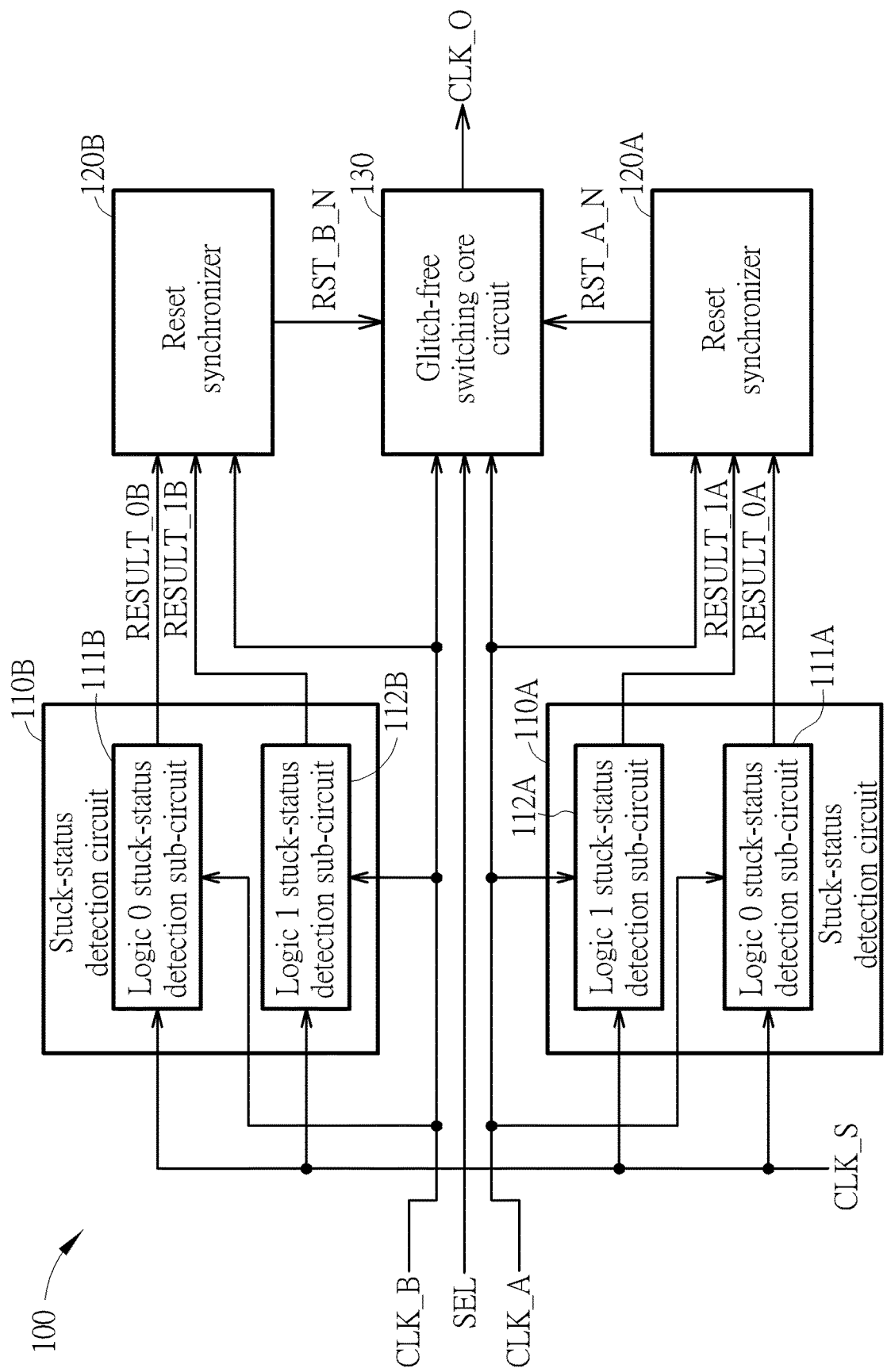
FIG. 1 is a diagram of a glitch-free clock switching circuit with clock loss tolerance according to an embodiment of the present invention.

FIG. 1 is a diagram of a glitch-free clock switching circuit 100 with clock loss tolerance according to an embodiment of the present invention. The glitch-free clock switching circuit 100 may comprise stuck-status detection circuits 110A and 110B, reset synchronizers 120A and 120B, and a glitch-free switching core circuit 130, where the stuck-status detection circuit 110A may comprise a logic 0 (or logic-0) stuck-status detection sub-circuit 111A and a logic 1 (or logic-1) stuck-status detection sub-circuit 112A, and the stuck-status detection circuit 110B may comprise a logic 0 stuck-status detection sub-circuit 111B and a logic 1 stuck-status detection sub-circuit 112B. For better comprehension, at least one portion (e.g., a portion or all) of the components mentioned above may be implemented by way of flip-flops such as D (or D-type) flip-flops (DFFs), logic gates, etc., but the present invention is not limited thereto.

The stuck-status detection circuit 110A can perform a plurality of first stuck-status detection operations on a clock source CLK_A according to a reference clock signal CLK_S to generate a plurality of first logic signals, where the logic values of the plurality of first logic signals represent stuck-status detection results of the plurality of first stuck-status detection operations. The reset synchronizer 120A can perform at least one first logic operation on the plurality of first logic signals to output a synchronized reset signal RST_A_N responsively, and more particularly, perform the aforementioned at least one first logic operation on the plurality of first logic signals to selectively change the logic value of the synchronized reset signal RST_A_N. In addition, the stuck-status detection circuit 110B can perform a plurality of second stuck-status detection operations on a clock source CLK_B according to the reference clock signal CLK_S to generate a plurality of second logic signals, where the logic values of the plurality of second logic signals represent stuck-status detection results of the plurality of second stuck-status detection operations. The reset synchronizer 120B can perform at least one second logic operation on the plurality of second logic signals to output a synchronized reset signal RST_B_N responsively, and more particularly, perform the aforementioned at least one second logic operation on the plurality of second logic signals to selectively change the logic value of the synchronized reset signal RST_B_N. Additionally, the glitch-free switching core circuit 130 can perform clock switching according to a clock switching signal SEL to switch an output clock CLK_O of the glitch-free clock switching circuit 100 (e.g., the output clock CLK_O for being output to a next stage circuit) from an original clock source to a target clock source, where the original clock source and the target clock source represent one of the clock sources CLK_A and CLK_B and the other of the clock sources CLK_A and CLK_B, respectively. As a result, the glitch-free clock switching circuit 100 can perform the clock switching based on the synchronized reset signals RST_A_N and RST_B_N to provide the clock loss tolerance.

Regarding the stuck-status detection circuit 110A, the plurality of first stuck-status detection operations may comprise a first logic 0 stuck-status detection operation and a first logic 1 stuck-status detection operation, and the plurality of first logic signals may comprise two first logic signals such as the logic signals RESULT_0A and RESULT_1A.

The logic 0 stuck-status detection sub-circuit 111A can perform the first logic 0 stuck-status detection operation regarding the clock source CLK_A (e.g., perform the first logic 0 stuck-status detection operation on the clock source CLK_A) according to the reference clock signal CLK_S to generate one logic signal among the two first logic signals, where the logic value of the one logic signal (e.g., the logic signal RESULT_0A) among the two first logic signals represents a stuck-status detection result of the first logic 0 stuck-status detection operation, for indicating whether the clock source CLK_A is stuck at the logic value 0 of the clock source CLK_A. In addition, the logic 1 stuck-status detection sub-circuit 112A can perform the first logic 1 stuck-status detection operation regarding the clock source CLK_A (e.g., perform the first logic 1 stuck-status detection operation on the clock source CLK_A) according to the reference clock signal CLK_S to generate another logic signal among the two first logic signals, where the logic value of the other logic signal (e.g., the logic signal RESULT_1A) among the two first logic signals represents a stuck-status detection result of the first logic 1 stuck-status detection operation, for indicating whether the clock source CLK_A is stuck at the logic value 1 of the clock source CLK_A.

Regarding the stuck-status detection circuit 110B, the plurality of second stuck-status detection operations may comprise a second logic 0 stuck-status detection operation and a second logic 1 stuck-status detection operation, and the plurality of second logic signals may comprise two second logic signals such as the logic signals RESULT_0B and RESULT_1B. The logic 0 stuck-status detection sub-circuit 111B can perform the second logic 0 stuck-status detection operation regarding the clock source CLK_B (e.g., perform the second logic 0 stuck-status detection operation on the clock source CLK_B) according to the reference clock signal CLK_S to generate one logic signal among the two second logic signals, where the logic value of the one logic signal (e.g., the logic signal RESULT_0B) among the two second logic signals represents a stuck-status detection result of the second logic 0 stuck-status detection operation, for indicating whether the clock source CLK_B is stuck at the logic value 0 of the clock source CLK_B. In addition, the logic 1 stuck-status detection sub-circuit 112B can perform the second logic 1 stuck-status detection operation regarding the clock source CLK_B (e.g., perform the second logic 1 stuck-status detection operation on the clock source CLK_B) according to the reference clock signal CLK_S to generate another logic signal among the two second logic signals, where the logic value of the other logic signal (e.g., the logic signal RESULT_1B) among the two second logic signals represents a stuck-status detection result of the second logic 1 stuck-status detection operation, for indicating whether the clock source CLK_B is stuck at the logic value 1 of the clock source CLK_B.

Based on the synchronized reset signals RST_A_N and RST_B_N, the glitch-free switching core circuit 130 allows the clock switching to be performed correctly in a situation where the original clock source is lost (e.g., stops toggling or stops oscillating).

For better comprehension, the logic 0 stuck-status detection sub-circuit 111A may be illustrated as performing the first logic 0 stuck-status detection operation on the clock source CLK_A, the logic 1 stuck-status detection sub-circuit 112A may be illustrated as performing the first logic 1 stuck-status detection operation on the clock source CLK_A, the logic 0 stuck-status detection sub-circuit 111B may be illustrated as performing the second logic 0 stuck-status detection operation on the clock source CLK_B, and the logic 1 stuck-status detection sub-circuit 112B may be illustrated as performing the second logic 1 stuck-status detection operation on the clock source CLK_B, but the invention is not limited thereto. According to some embodiments, the logic 0 stuck-status detection sub-circuit 111A may be illustrated as performing the first logic 0 stuck-status detection operation on the clock source CLK_A, the logic 1 stuck-status detection sub-circuit 112A may be illustrated as performing the first logic 1 stuck-status detection operation on the clock source CLK_A, the logic 0 stuck-status detection sub-circuit 111B may be illustrated as performing the second logic 0 stuck-status detection operation on the clock source CLK_B, and/or the logic 1 stuck-status detection sub-circuit 112B may be illustrated as performing the second logic 1 stuck-status detection operation on the clock source CLK_B.

According to some embodiments, any of multiple D-type flip-flops in the glitch-free clock switching circuit 100 may be illustrated as having a data input terminal D, a data output terminal Q, an inverted data output terminal QB (which may also be labeled as "$\overline{Q}$", where the suffix "B" may be expressed with a bar on "Q"), any terminal among a reset terminal R and an inverted reset terminal RB, and/or any terminal among a set terminal S and an inverted set terminal SB, where the suffix "B" (or the bar) in the symbols of some terminals/signals (e.g., the inverted data output terminal QB) may indicate that these terminals/signals are the inverted terminals/signals of the corresponding terminals/signals (e.g., the data output terminal Q), respectively. For example, the reset signal on the reset terminal R and the set signal on the set terminal S are both high active, and more particularly, for any (e.g., each) of this reset signal and this set signal, the high voltage level and the low voltage level may represent the logic values 1 and 0, respectively. For another example, the reset signal on the inverted reset terminal RB and the set signal on the inverted set terminal SB are both low active, and more particularly, for any (e.g., each) of this reset signal and this set signal, the low voltage level and the high voltage level may represent the logic values 1 and 0, respectively. In addition, for any D-type flip-flop among these D-type flip-flops, when the reset signal carries the logic value 1, this D-type flip-flop can control the logic signal on the data output terminal Q thereof to have a low voltage level to indicate the logic value 0; when the set signal carries the logic value 1, this D-type flip-flop can control the logic signal on the data output terminal Q thereof to have a high voltage level to indicate the logic value 1.

Figure 2:
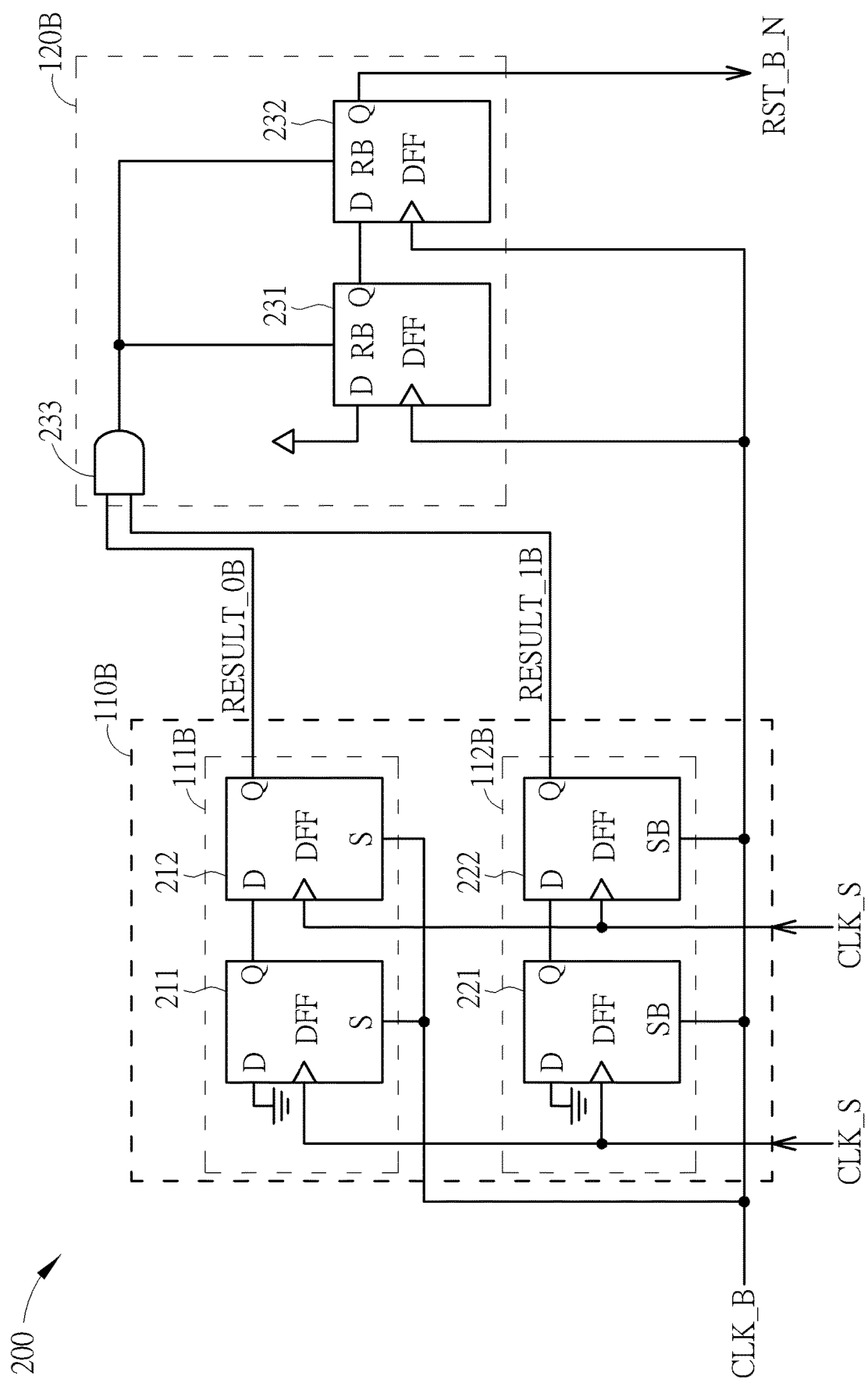
FIG. 2 is a diagram illustrating a first control module in the glitch-free clock switching circuit shown in FIG. 1 according to an embodiment of the present invention.

FIG. 2 is a diagram illustrating a first control module 200 in the glitch-free clock switching circuit 100 shown in FIG. 1 according to an embodiment of the present invention. The first control module 200 may comprise D-type flip-flops 211, 212, 221, 222, 231 and 232 (labeled "DFF" for brevity) and an AND gate 233, but the invention is not limited thereto. According to some embodiments, the architecture of the first control module 200 may vary.

According to the reference clock signal CLK_S, the logic 0 stuck-status detection sub-circuit 111B (e.g., the D-type flip-flops 211 and 212) can perform the second logic 0 stuck-status detection operation regarding the clock source CLK_B, and more particularly, perform the second logic 0 stuck-status detection operation on the clock source CLK_B to generate the one logic signal (e.g., the logic signal RESULT_0B) among the two second logic signals, for being output to the AND gate 233. According to the reference clock signal CLK_S, the logic 1 stuck-status detection sub-circuit 112B (e.g., the D-type flip-flops 221 and 222) can perform the second logic 1 stuck-status detection operation regarding the clock source CLK_B, and more particularly, perform the second logic 1 stuck-status detection operation on the clock source CLK_B to generate the other logic signal (e.g., the logic signal RESULT_1B) among the two second logic signals, for being output to the AND gate 233.

In addition, at least one logic gate (e.g., the AND gate 233) in the reset synchronizer 120B can perform the aforementioned at least one second logic operation on the plurality of second logic signals (e.g., the second logic signals RESULT_0B and RESULT_1B mentioned above) to generate a second intermediate reset signal (e.g., the output of the AND gate 233), and a plurality of flip-flops (e.g., the D-type flip-flops 231 and 232) in the reset synchronizer 120B can generate the synchronized reset signal RST_B_N according to a second voltage level (e.g., a high voltage level input into the D-type flip-flop 231, where this high voltage level may represent the logic value 1 for the D-type flip-flops 231 and 232) to make the logic value of the synchronized reset signal RST_B_N be equal to a second predetermined logic value such as the logic value 1 by default, and output the logic value of the synchronized reset signal RST_B_N responsively according to the second intermediate reset signal, and more particularly, selectively change the logic value of the synchronized reset signal RST_B_N according to the second intermediate reset signal, for example, change the logic value of the synchronized reset signal RST_B_N from the default logic value 1 to the logic value 0, as if outputting (e.g., synchronously releasing) the second intermediate reset signal as the synchronized reset signal RST_B_N.

Figure 3:
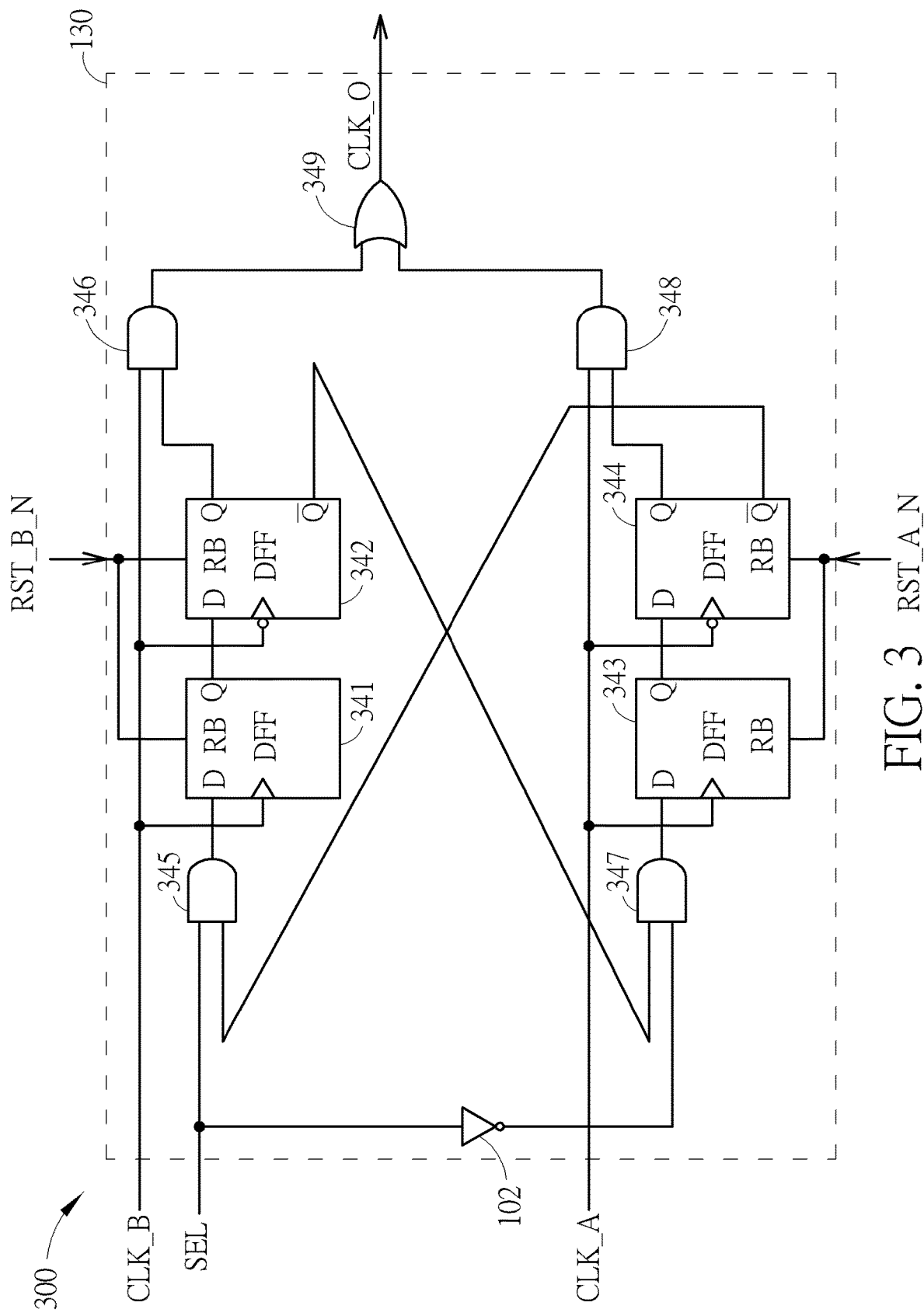
FIG. 3 is a diagram illustrating a clock switching module in the glitch-free clock switching circuit shown in FIG. 1 according to an embodiment of the present invention.

FIG. 3 is a diagram illustrating a clock switching module 300 in the glitch-free clock switching circuit 100 shown in FIG. 1 according to an embodiment of the present invention. The clock switching module 300 may comprise D-type flip-flops 341, 342, 343 and 344 (labeled "DFF" for brevity) and AND gates 345, 346, 347 and 348, and further comprise an OR gates 349 and an inverter 102, but the present invention is not limited thereto. According to some embodiments, the architecture of the clock switching module 300 may vary.

A plurality of first flip-flops (e.g., the D-type flip-flops 343 and 344) in the glitch-free switching core circuit 130 can form a first state machine corresponding to the clock source CLK_A, and more particularly, can receive the clock source CLK_A and the synchronized reset signal RST_A_N, and selectively perform a reset operation according to the clock source CLK_A and the synchronized reset signal RST_A_N. A plurality of second flip-flops (e.g., the D-type flip-flops 341 and 342) in the glitch-free switching core circuit 130 can form a second state machine corresponding to the clock source CLK_B, and more particularly, can receive the clock source CLK_B and the synchronized reset signal RST_B_N, and selectively perform a reset operation according to the clock source CLK_B and the synchronized reset signal RST_B_N.

Figure 4:
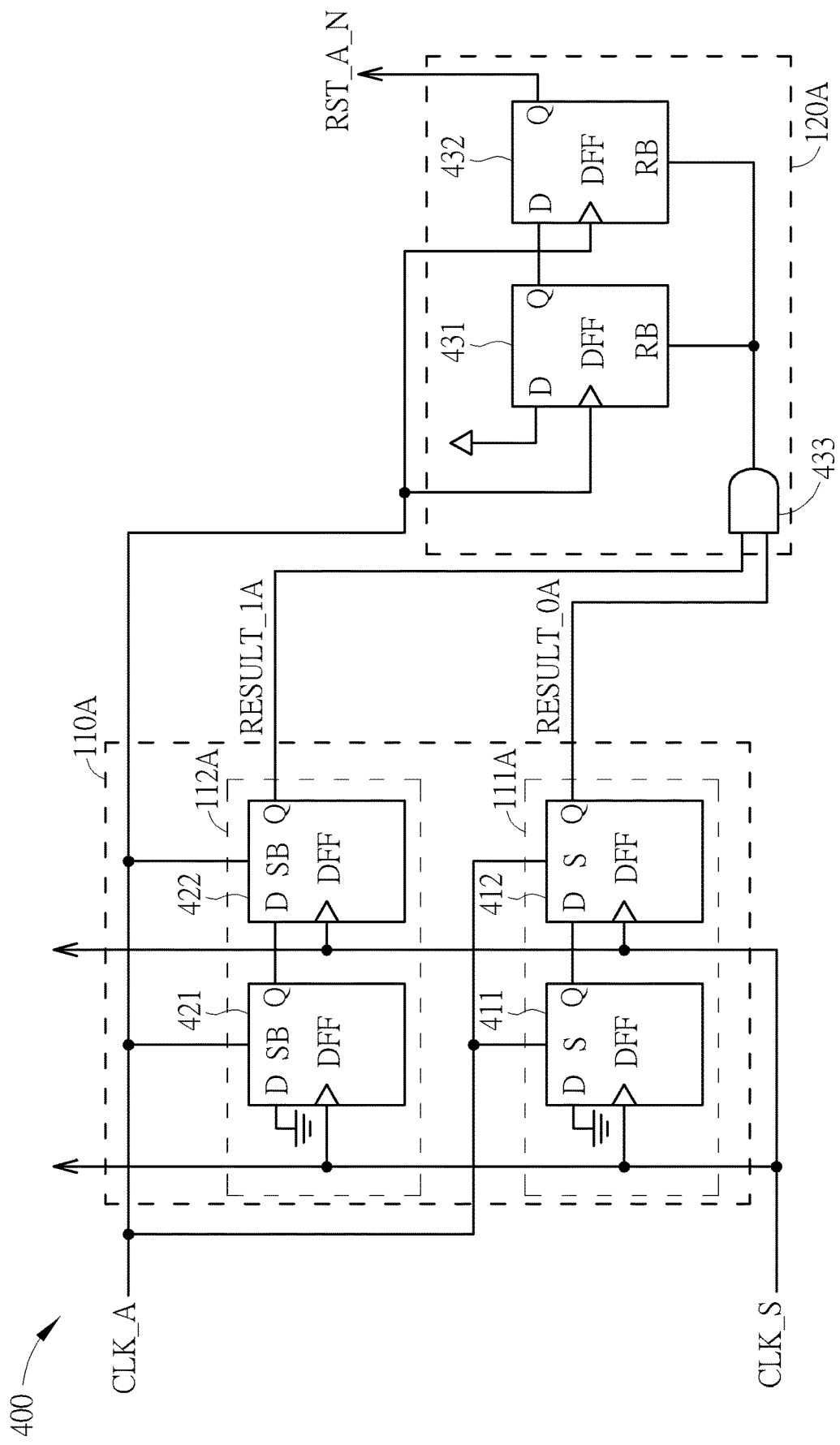
FIG. 4 is a diagram illustrating a second control module in the glitch-free clock switching circuit shown in FIG. 1 according to an embodiment of the present invention.

FIG. 4 is a diagram illustrating a second control module 400 in the glitch-free clock switching circuit 100 shown in FIG. 1 according to an embodiment of the present invention. The second control module 400 may comprise D-type flip-flops 411, 412, 421, 422, 431 and 432 (labeled "DFF" for brevity) and an AND gate 433, but the invention is not limited thereto. According to some embodiments, the architecture of the second control module 400 may vary.

According to the reference clock signal CLK_S, the logic 0 stuck-status detection sub-circuit 111A (e.g., the D-type flip-flops 411 and 412) can perform the first logic 0 stuck-status detection operation regarding the clock source CLK_A, and more particularly, perform the first logic 0 stuck-status detection operation on the clock source CLK_A to generate the one logic signal (e.g., the logic signal RESULT_0A) among the two first logic signals, for being output to the AND gate 433. According to the reference clock signal CLK_S, the logic 1 stuck-status detection sub-circuit 112A (e.g., the D-type flip-flops 421 and 422) can perform the first logic 1 stuck-status detection operation regarding the clock source CLK_A, and more particularly, perform the first logic 1 stuck-status detection operation on the clock source CLK_A to generate the other logic signal (e.g., the logic signal RESULT_1A) among the two first logic signals, for being output to the AND gate 433.

In addition, at least one logic gate (e.g., the AND gate 433) in the reset synchronizer 120A can perform the aforementioned at least one first logic operation on the plurality of first logic signals (e.g., the first logic signals RESULT_0A and RESULT_1A mentioned above) to generate a first intermediate reset signal (e.g., the output of the AND gate 433), and a plurality of flip-flops (e.g., the D-type flip-flops 431 and 432) in the reset synchronizer 120A can generate the synchronized reset signal RST_A_N according to a first voltage level (e.g., a high voltage level input into the D-type flip-flop 431, where this high voltage level may represent the logic value 1 for the D-type flip-flops 431 and 432) to make the logic value of the synchronized reset signal RST_A_N be equal to a first predetermined logic value such as the logic value 1 by default, and output the logic value of the synchronized reset signal RST_A_N responsively according to the first intermediate reset signal, and more particularly, selectively change the logic value of the synchronized reset signal RST_A_N according to the first intermediate reset signal, for example, change the logic value of the synchronized reset signal RST_A_N from the default logic value 1 to the logic value 0, as if outputting (e.g., synchronously releasing) the first intermediate reset signal as the synchronized reset signal RST_A_N.

Figure 5:
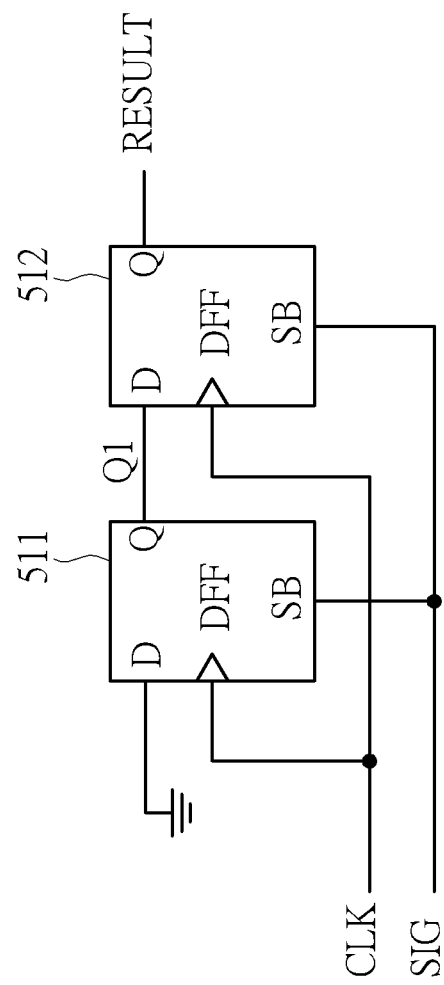
FIG. 5 is a diagram illustrating a stuck-status detection sub-circuit in the glitch-free clock switching circuit shown in FIG. 1 according to an embodiment of the present invention.

FIG. 5 is a diagram illustrating a stuck-status detection sub-circuit 500 in the glitch-free clock switching circuit 100 shown in FIG. 1 according to an embodiment of the present invention. The stuck-status detection sub-circuit 500 may comprise D-type flip-flops 511 and 512, and the D-type flip-flops 511 and 512 may output the logic signals Q1 and RESULT, respectively. For example, a plurality of stuck-status detection sub-circuits of the glitch-free clock switching circuit 100 shown in FIG. 1 may comprise the logic 0 stuck-status detection sub-circuits 111A and 111B and the logic 1 stuck-status detection sub-circuits 112A and 112B, and the stuck-status detection sub-circuit 500 may represent any stuck-status detection sub-circuit among the plurality of stuck-status detection sub-circuits, and more particularly, the D-type flip-flops 511 and 512 may represent two corresponding D-type flip-flops within the aforementioned any stuck-status detection sub-circuit, respectively, where the clock signal CLK may represent the reference clock signal CLK_S, and the clock source SIG may represent the clock source to be detected, such as a certain clock source among the clock sources CLK_A and CLK_B, or a certain inverted signal (or inverted clock) among the inverted signal (or inverted clock) of the clock source CLK_A and the inverted signal (or inverted clock) of the clock source CLK_B. For brevity, similar descriptions for this embodiment are not repeated in detail here.

According to some embodiments, the reference clock signal CLK_S may be a system clock. The system clock is always alive. For example, when the electronic device where the glitch-free clock switching circuit 100 is positioned is sleeping (e.g., enters a sleep mode thereof), the system clock will not disappear. In addition, in order to achieve the requirement of power saving when the electronic device is sleeping, the system clock may have a low frequency, which may make the system clock be suitable for being used as the reference clock signal CLK_S. The reference clock signal CLK_S such as the system clock typically has a lower frequency than the respective frequencies of the clock sources CLK_A and CLK_B. For brevity, similar descriptions for these embodiments are not repeated in detail here.

Figure 6:
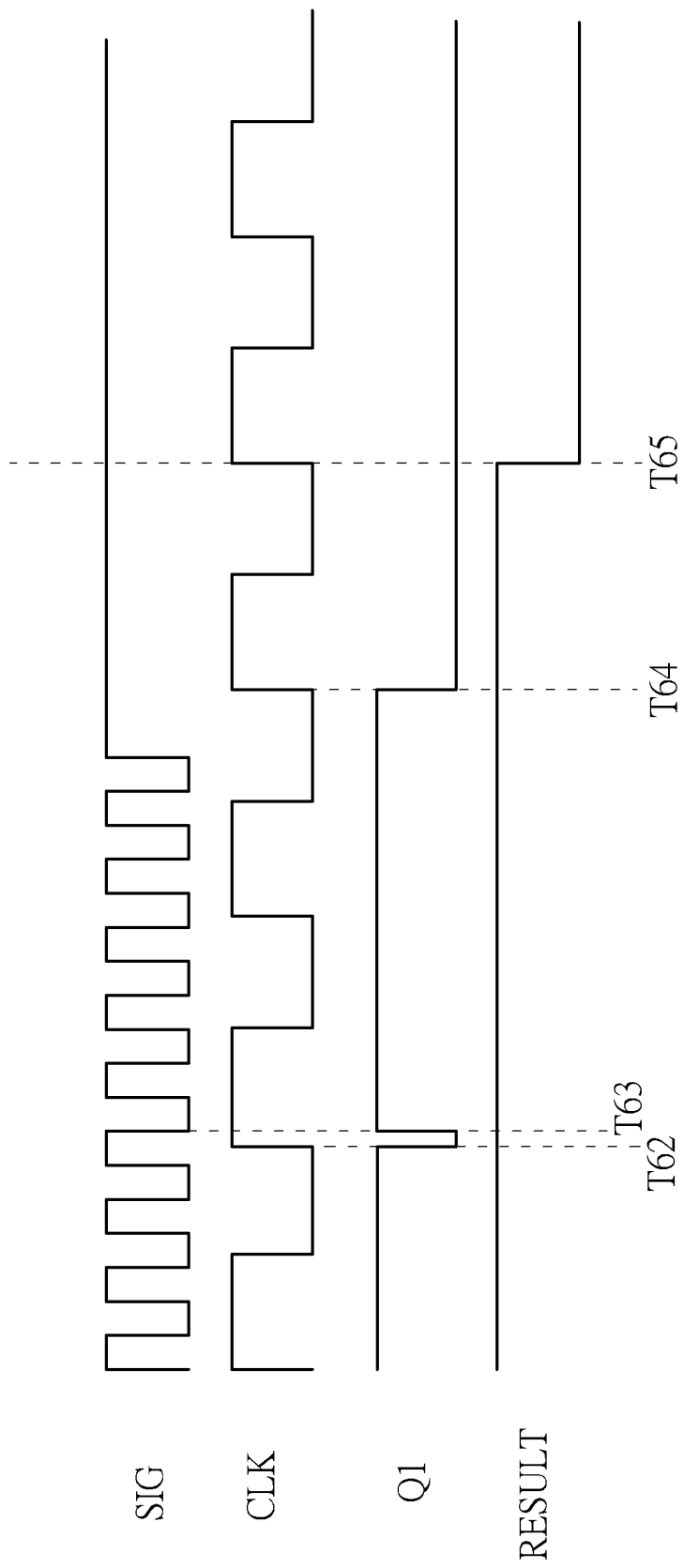
FIG. 6 illustrates examples of the associated signals of the stuck-status detection sub-circuit shown in FIG. 5.

FIG. 6 illustrates examples of the associated signals of the stuck-status detection sub-circuit 500 shown in FIG. 5. For better comprehension, the operation of any cycle (e.g., each cycle) among multiple cycles of the D-type flip-flops 511 and 512 can be triggered by a rising edge of the clock signal CLK, and the ratio (P_CLK/P_SIG) of the period P_CLK of the clock signal CLK to the period P_SIG of the clock source SIG is not an integer. Designing this ratio (P_CLK/P_SIG) to be a non-integer can prevent metastability from recurring (e.g., in a situation where this ratio (P_CLK/P_SIG) is an integer greater than one, a problem that every rising edge of the clock signal CLK triggers sampling the clock source SIG at the edge of the clock source SIG may occur).

As shown in FIG. 6, the stuck-status detection sub-circuit 500 can perform stuck-status detection on the clock source SIG multiple times, and more particularly, using the D-type flip-flop 511 to perform first-stage stuck-status detection on the clock source SIG and using the D-type flip-flop 512 to perform second-stage stuck-status detection on the clock source SIG. In the case that the clock source SIG is alive, the stuck-status detection sub-circuit 500 may detect a glitch (e.g., the logic value of the logic signal Q1 in the interval [T62, T63] defined by the time points T62 and T63) in the first-stage stuck-status detection, but the glitch shown in FIG. 6 cannot pass through the D-type flip-flop 512, and therefore, when the glitch shown in FIG. 6 exists, the architecture shown in FIG. 5 can prevent the clock source SIG from being detected as getting stuck in the second-stage stuck-status detection. Based on the architecture shown in FIG. 5, the stuck-status detection sub-circuit 500 can convert the logic signal Q1 into the logic signal RESULT, for example, change the detection result represented by the logic signal Q1 into the detection result represented by the logic signal RESULT, as the detection result output by the stuck-status detection sub-circuit 500, where the logic signal RESULT has no change in the interval [T62, T63] defined by the time points T62 and T63. When the clock source SIG is stuck, the stuck-status detection sub-circuit 500 can detect the event that the clock source SIG is stuck, such as the event that the clock source SIG stays at the high voltage level (e.g., the logic value 1 of the clock source SIG, or the logic value 0 of the set signal on the inverted set terminal SB (when the clock source SIG is used as this set signal)). For example, this event (e.g., the indication thereof) that the clock source SIG is stuck may be passed or forwarded to the logic signals Q1 and RESULT at the time points T64 and T65, respectively, to make the logic values of the logic signals Q1 and RESULT change. For brevity, similar descriptions for this embodiment are not repeated in detail here.

In the embodiments described above, the stuck-status detection sub-circuit 500 can detect the event that the clock source SIG is stuck, such as the event that the clock source SIG stays at the high voltage level, but the invention is not limited thereto. According to some embodiments, the stuck-status detection sub-circuit 500 can detect the event that the clock source SIG is stuck, such as the event that the clock source SIG stays at the low voltage level (e.g., the logic value 0 of the clock source SIG, or the logic value 1 of the set signal on the inverted set terminal SB (when the clock source SIG is used as this set signal)), where the waveform of the clock source SIG shown in FIG. 6 can be replaced with the inverted waveform thereof. For example, the architecture of the stuck-status detection sub-circuit 500 may vary, and more particularly, the inverted set terminal SB of each D-type flip-flop among the D-type flip-flops 511 and 512 can be replaced with the set terminal S. For another example, an inverter may be added onto a common input path input into the respective inverted set terminals SB of the D-type flip-flops 511 and 512 to perform inverting operation(s) on the clock source SIG in advance. For brevity, similar descriptions for these embodiments are not repeated in detail here.

Figure 7:
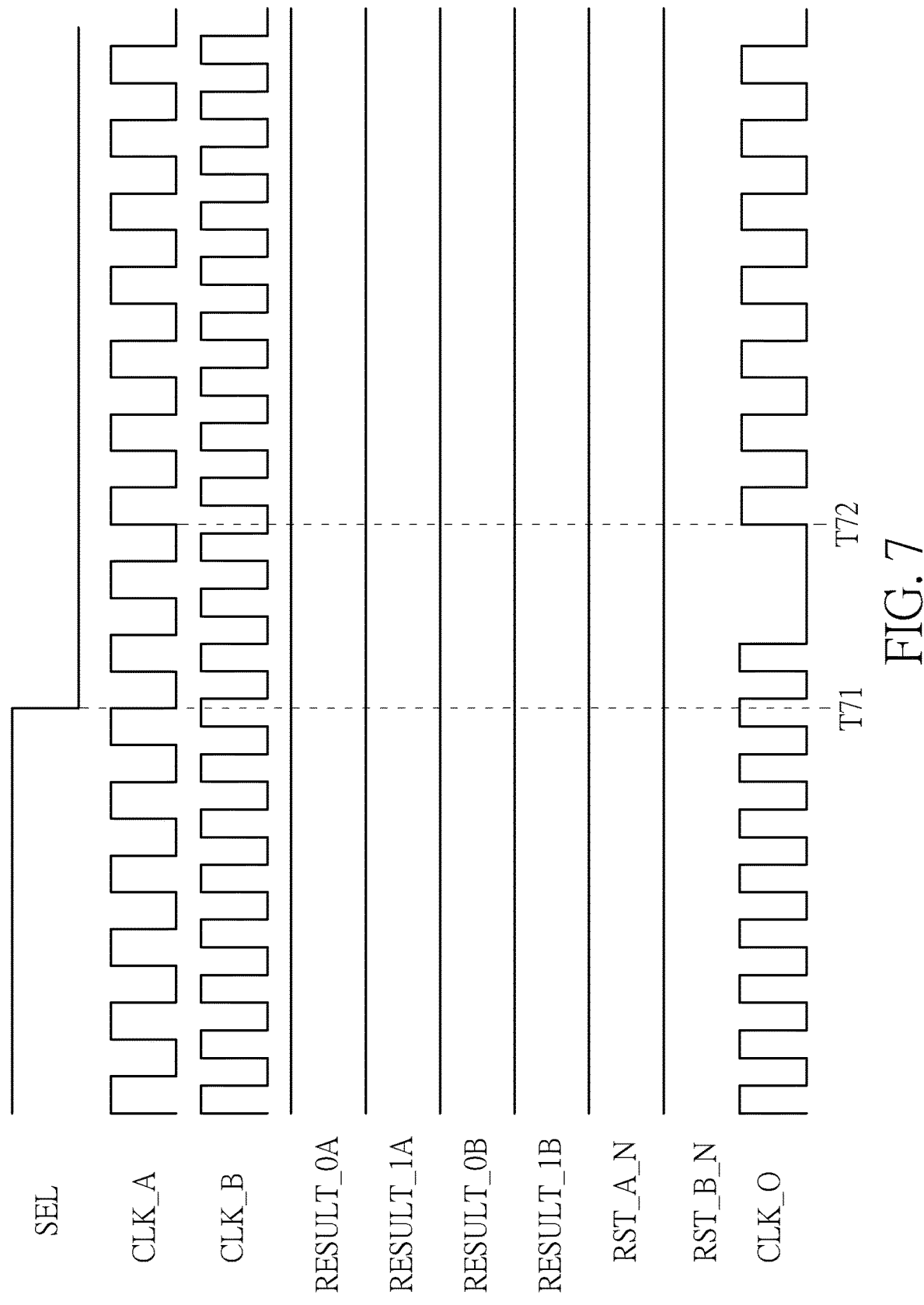
FIG. 7 illustrates examples of the associated signals of the glitch-free clock switching circuit shown in FIG. 1 in the case of clock switching when both of two input clocks are alive (or active).

FIG. 7 illustrates examples of the associated signals of the glitch-free clock switching circuit 100 shown in FIG. 1 in the case of clock switching when both of the two input clocks are alive (or active). The clock switching signal SEL can be changed, and more particularly, pulled low at time point T71 to indicate the request of switching from a certain input clock (e.g., the clock source CLK_B) among these two input clocks to the other input clock (e.g., the clock source CLK_A) among these two input clocks, where a processing circuit in the electronic device can be arranged to control the operations of the electronic device, and can issue the request. Based on the architecture shown in FIG. 1 (e.g., the architectures respectively shown in FIG. 2, FIG. 3 and FIG. 4), the glitch-free clock switching circuit 100 can, starting from the time point T72, correctly output the target clock source as the output clock CLK_O, without generating any glitch on the output clock CLK_O. For brevity, similar descriptions for this embodiment are not repeated in detail here.

Figure 8:
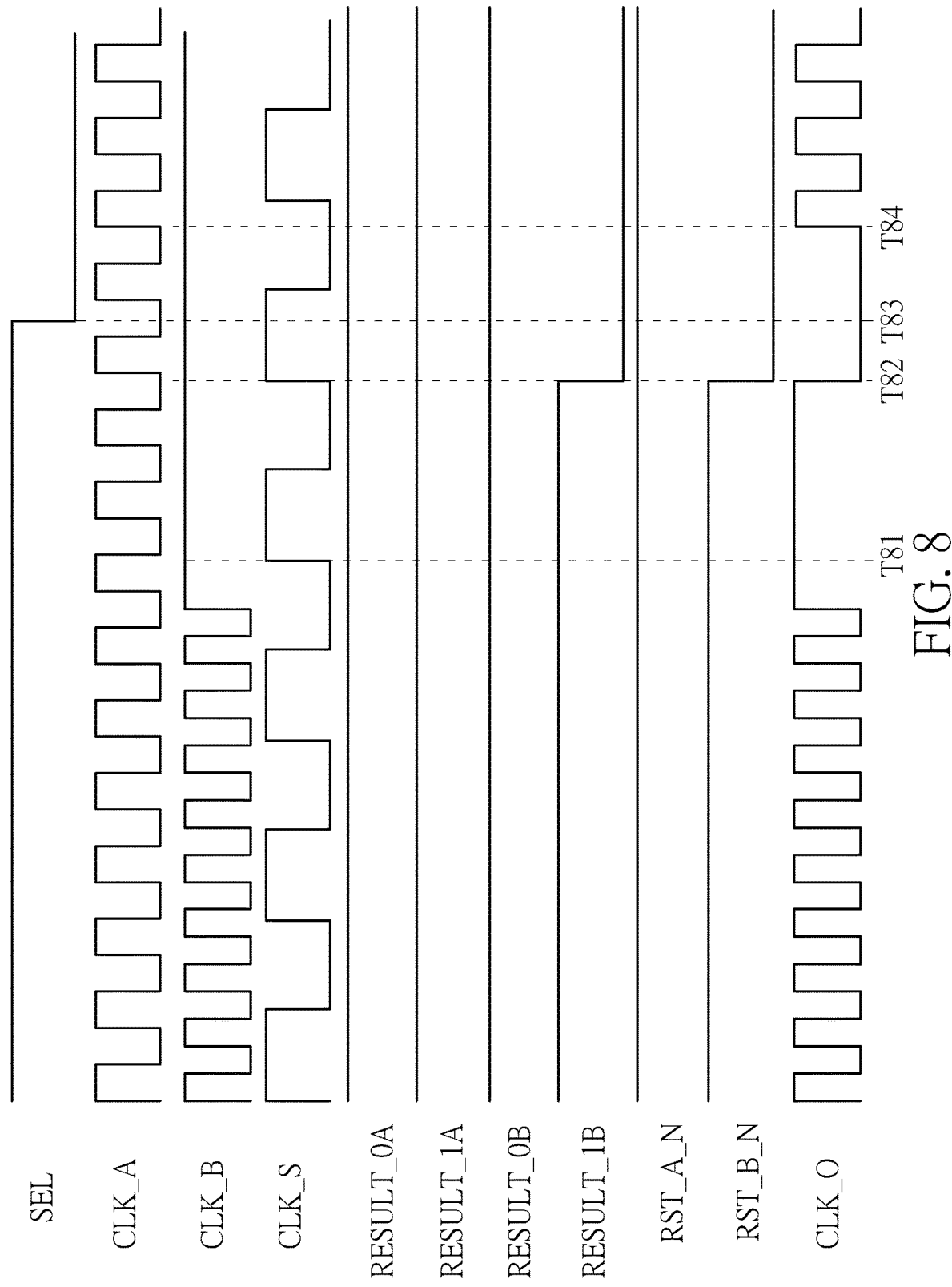
FIG. 8 illustrates examples of the associated signals of the glitch-free clock switching circuit shown in FIG. 1 in a situation where the clock switching signal is changed after the clock stuck-status is detected.

FIG. 8 illustrates examples of the associated signals of the glitch-free clock switching circuit 100 shown in FIG. 1 in a situation where the clock switching signal SEL is changed after the clock stuck-status is detected, wherein the clock source CLK_B has been stuck before the time point T81, and the clock switching signal SEL is pulled low at the time point T83 to indicate the request of switching from the clock source CLK_B to the clock source CLK_A. Based on the architecture shown in FIG. 1 (e.g., the architectures respectively shown in FIG. 2, FIG. 3 and FIG. 4), when the logic values of the logic signals RESULT_0A and RESULT_1A do not change, the logic value of the synchronized reset signal RST_A_N does not change, and the logic value of a certain logic signal among the logic signals RESULT_0B and RESULT_1B, such as the logic value of the logic signal RESULT_1B in this embodiment, may change at the time point T82, so the logic value of the synchronized reset signal RST_B_N may also change correspondingly at the time point T82. As a result, the glitch-free clock switching circuit 100 can detect at the time point T82 that the clock source CLK_B is stuck, and more particularly, utilize the synchronized reset signal RST_B_N to reset the D-type flip-flops 341 and 342 at the time point T82, to make the logic signals output by the data output terminal Q and the inverted data output terminal QB (labeled "Q" for brevity) of the D-type flip-flop 342 have the low voltage level (e.g., the logic value 0) and the high voltage level (e.g., the logic value 1), respectively. The high voltage level of the logic signal transmitted from the D-type flip-flop 342 to the AND gate 347 turns on the data path within the AND gate 347 at the time point T82, to allow the voltage level output by the AND gate 347 to change with the voltage level of the inverted signal output by the inverter 102, as if the inverted signal (e.g., its logic value) of the clock switching signal SEL is transmitted from the inverter 102 to the D-type flip-flop 343 through the AND gate 347. In this situation, the clock switching signal SEL is pulled low at the time point T83 and the inverted signal thereof is pulled high at the same time, to make the glitch-free switching core circuit 130 correspondingly perform clock switching to correctly output the target clock source as the output clock CLK_O at the time point T84. For brevity, similar descriptions for this embodiment are not repeated in detail here.

Figure 9:
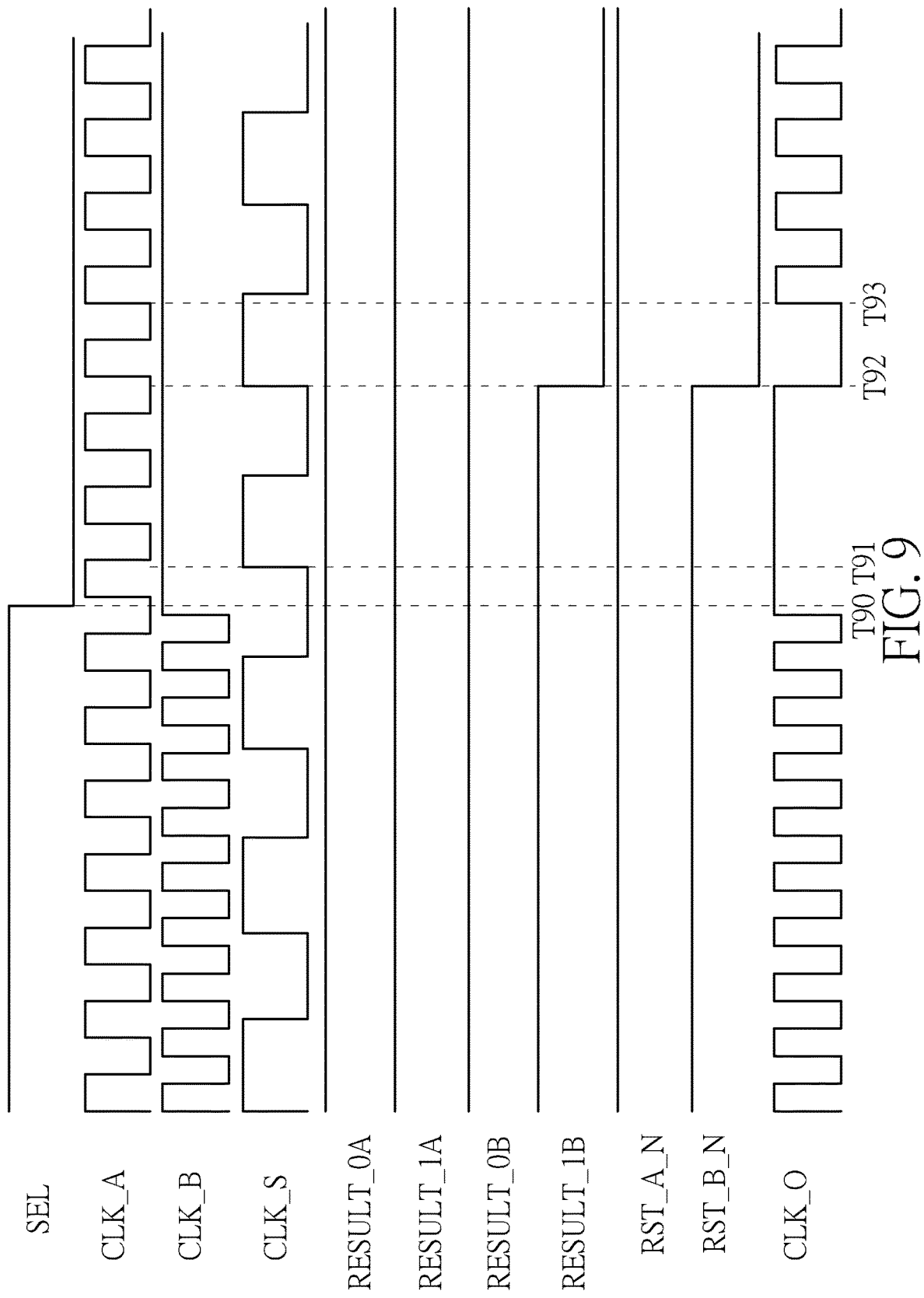
FIG. 9 illustrates examples of the associated signals of the glitch-free clock switching circuit shown in FIG. 1 in a situation where the clock switching signal is changed before the clock stuck-status is detected.

FIG. 9 illustrates examples of the associated signals of the glitch-free clock switching circuit 100 shown in FIG. 1 in a situation where the clock switching signal SEL is changed before the clock stuck-status is detected, wherein it is assumed that the clock switching signal SEL is pulled low at the time point T90 to indicate the request of switching from the clock source CLK_B to the clock source CLK_A, but the glitch-free clock switching circuit 100 preliminarily detects by the first-stage stuck-status detection at the time point T91 that the clock source CLK_B is stuck, and detects by the second-stage stuck-status detection at the time point T92 that the clock source CLK_B is stuck. The clock switching signal SEL is pulled low and the inverted signal thereof is pulled high at the same time, and the high voltage level of this inverted signal turns on the data path within the AND gate 347, to allow the voltage level output by the AND gate 347 to change with the voltage level of the logic signal output by the inverted data output terminal QB (labeled "$\overline{Q}$" for brevity) of the D-type flip-flop 342, as if this logic signal (e.g., its logic value) is transmitted from the D-type flip-flop 342 to the D-type flip-flop 343 through the AND gate 347. In this situation, the glitch-free clock switching circuit 100 can detect at the time point T92 that the clock source CLK_B is stuck, wherein based on the architecture shown in FIG. 1 (e.g., the architectures respectively shown in FIG. 2, FIG. 3 and FIG. 4), when the logic values of the logic signals RESULT_0A and RESULT_1A do not change, the logic value of the synchronized reset signal RST_A_N does not change, and the logic value of a certain logic signal among the logic signals RESULT_0B and RESULT_1B, such as the logic value of the logic signal RESULT_1B in this embodiment, may change at the time point T92, so the logic value of the synchronized reset signal RST_B_N may also change correspondingly at the time point T92. More particularly, the glitch-free clock switching circuit 100 can utilize the synchronized reset signal RST_B_N to reset the D-type flip-flops 341 and 342 at the time point T92, to make the logic signals output by the data output terminal Q and the inverted data output terminal QB (labeled "$\overline{Q}$" for brevity) of the D-type flip-flop 342 have the low voltage level (e.g., the logic value 0) and the high voltage level (e.g., the logic value 1), respectively, to make the glitch-free switching core circuit 130 correspondingly perform clock switching to correctly output the target clock source as the output clock CLK_O at the time point T93. For brevity, similar descriptions for this embodiment are not repeated in detail here.

According to some embodiments, the present invention further provides a glitch-free clock switching device comprising the glitch-free clock switching circuit 100, for being installed in the electronic device. The glitch-free clock switching device may comprise X glitch-free clock switching circuits #1, #2, . . . and #X, which may be coupled to each other, and more particularly, may be coupled to each other in a cascading manner to form a tree-like structure. In addition, the X glitch-free clock switching circuits #1, #2, . . . and #X may be arranged to switch from a certain input clock among Y clock signals CLK_1, CLK_2, . . . and CLK_Y to another input clock among the Y clock signals CLK_1, CLK_2, . . . and CLK_Y for further use, where the Y clock signals CLK_1, CLK_2, . . . and CLK_Y comprise the clock sources CLK_A and CLK_B, the respective circuit architectures of the X glitch-free clock switching circuits #1, #2, . . . and #X are equal to each other (e.g., one of these circuit architectures is the same as another of these circuit architectures), and the glitch-free clock switching circuit 100 is one of the X glitch-free clock switching circuits #1, #2, . . . and #X.

Figure 10:
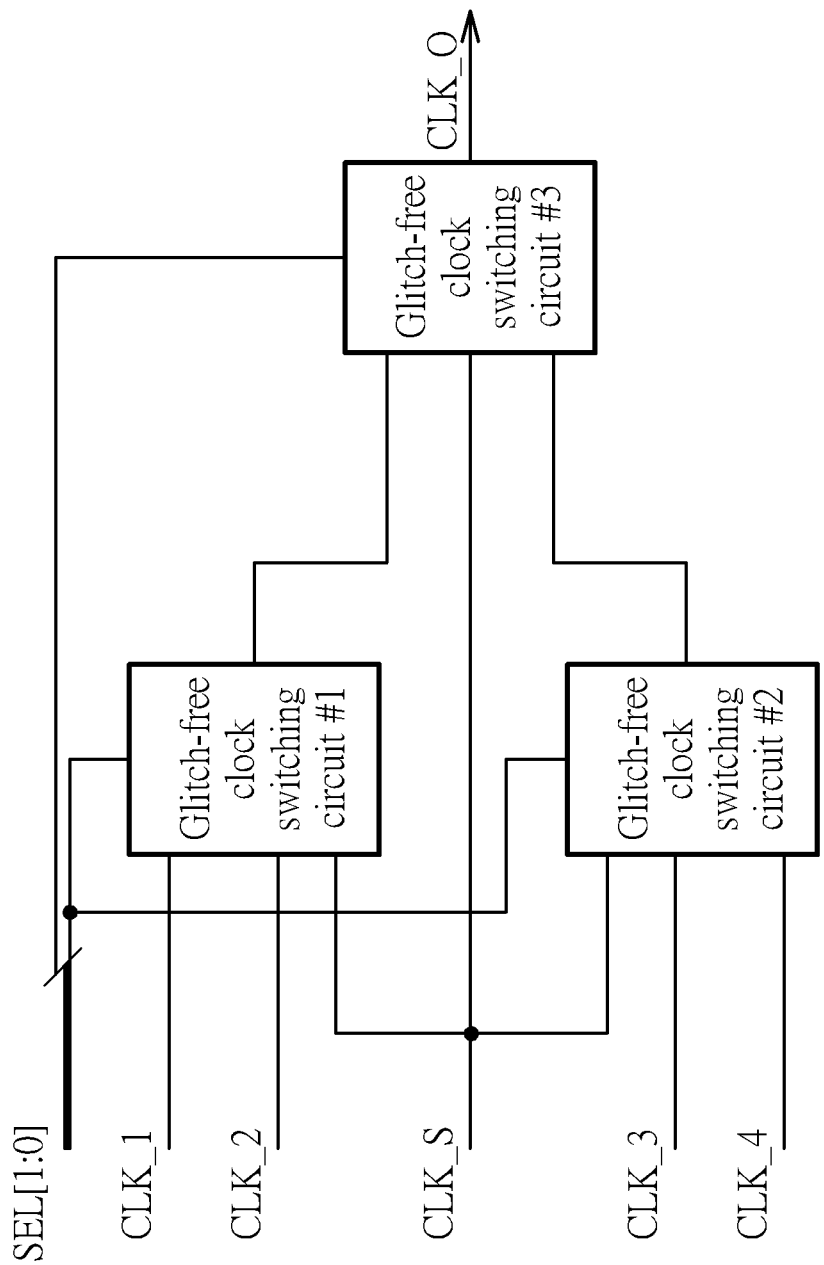
FIG. 10 is a diagram of a glitch-free clock switching device with clock loss tolerance according to an embodiment of the present invention.

FIG. 10 is a diagram of a glitch-free clock switching device with clock loss tolerance according to an embodiment of the present invention. For example, X=3 and Y=4, but the present invention is not limited thereto. In some embodiments, X and/or Y may vary. In addition, the glitch-free clock switching device may comprise Z layers of glitch-free clock switching circuits (which may be collectively referred to as the Z-layer glitch-free clock switching circuit for brevity), such as:

(1) a layer of glitch-free clock switching circuit(s), such as the glitch-free clock switching circuits #1 and #2, where the glitch-free clock switching circuit #1 can perform clock switching on the clock signals CLK_1 and CLK_2 to selectively output one of the clock signals CLK_1 and CLK_2 for further use, and the glitch-free clock switching circuit #2 can perform clock switching on the clock signals CLK_3 and CLK_4 to selectively output one of the clock signals CLK_3 and CLK_4 for further use; and (2) another layer of glitch-free clock switching circuit(s), such as the glitch-free clock switching circuit #3, where the glitch-free clock switching circuit #3 can perform clock switching on the clock signals received from the previous layer (e.g., the glitch-free clock switching circuits #1 and #2) to selectively output one of these clock signals received from the previous layer to be the output clock CLK_O of the glitch-free clock switching device for further use;

where the clock switching signals SEL[(Z−1):0] (e.g., the clock switching signals SEL[1:0], if Z=2) of the Z layers of glitch-free clock switching circuits may comprise the respective clock switching signals {SEL(Z−1), . . . , SEL(0)} (e.g., the clock switching signals {SEL(1), SEL(0)}, if Z=2) of the Z layers of glitch-free clock switching circuits, but the present invention is not limited thereto. According to some embodiments, when there is a need, the layer count Z, the glitch-free clock switching circuit count X and the clock signal count Y can be arbitrarily configured.

TABLE 1

| Z | 1 | 2 | 3 | 4 | ... |
|---|---|---|---|---|---|
| Y_max | 2 | 4 | 8 | 16 | ... |
| X_max | 1 | 3 | 7 | 15 | ... |

Table 1 illustrates examples of the respective maximum values X_max and Y_max of the glitch-free clock switching circuit count X and the clock signal count Y in a situation where the layer count Z is given. When Z=1, Y_max=$2^1$=2 and X_max=1; when Z=2, Y_max=$2^2$=4 and X_max=1+2=3; when Z=3, Y_max=$2^3$=8 and X_max=1+2+4=7; when Z=4, Y_max=$2^4$=16 and X_max=1+2+4+8=15; and the rest can be deduced by analogy.

According to some embodiments, the present invention further provides an operation method of the glitch-free clock switching circuit 100, where the operation method may comprise:

(1) utilizing the stuck-status detection circuit 110A in the glitch-free clock switching circuit 100 to perform the plurality of first stuck-status detection operations mentioned above on the clock source CLK_A according to the reference clock signal CLK_S to generate the plurality of first logic signals mentioned above;

(2) utilizing the reset synchronizer 120A in the glitch-free clock switching circuit 100 to perform the aforementioned at least one first logic operation on the plurality of first logic signals to output the synchronized reset signal RST_A_N responsively;

(3) utilizing the stuck-status detection circuit 110B in the glitch-free clock switching circuit 100 to perform the plurality of second stuck-status detection operations mentioned above on the clock source CLK_B according to the reference clock signal CLK_S to generate the plurality of second logic signals mentioned above;

(4) utilizing the reset synchronizer 120B in the glitch-free clock switching circuit 100 to perform the aforementioned at least one second logic operation on the plurality of second logic signals to output the synchronized reset signal RST_B_N responsively; and (5) utilizing the glitch-free switching core circuit 130 in the glitch-free clock switching circuit 100 to perform the clock switching mentioned above according to the clock switching signal SEL to switch the output clock CLK_O of the glitch-free clock switching circuit 100 from the original clock source to the target clock source, where the original clock source and the target clock source represent one of the clock sources CLK_A and CLK_B and the other of the clock sources CLK_A and CLK_B, respectively;

where the glitch-free clock switching circuit 100 can perform the clock switching based on the synchronized reset signals RST_A_N and RST_B_N to provide the clock loss tolerance, and the clock sources CLK_A and CLK_B are different from each other at at least one time point, but the invention is not limited thereto. For brevity, similar descriptions for these embodiments are not repeated in detail here.

The glitch-free clock switching circuit 100 with the clock loss tolerance and the operation method thereof that are provided by the present invention can correctly perform the clock switching in a situation where the original clock source is lost (e.g., stops toggling or stops oscillating), and can prevent various problems of the related art. For example:

(1) in comparison with the first conventional method mentioned above, the architecture of the present invention does not have the limitation of the select toggle rate (e.g., there is no need of a select ready signal, and this architecture is more user-friendly) and the limitation of the input clock ratio between two input clocks (e.g., this architecture is more suitable for microcontroller unit (MCU) clock systems); and (2) in comparison with the second conventional method mentioned above, the architecture of the present invention merely needs a very low cost (e.g., by using only eight D-type flip-flops) to implement the clock loss detection mechanism therein such as the stuck-status detection circuits 110A and 110B, and does not require any user programming (e.g., there is no need of any cost of programming registers, and this architecture is more user-friendly).

In addition, the glitch-free clock switching device (e.g., the architecture shown in FIG. 10) provided by the present invention can be realized by cascading the glitch-free clock switching circuits 100, and more particularly, when the number of input clocks is greater than 2, this cascading architecture does not have any limitation (e.g., the layer count and/or the size of this cascading architecture can be arbitrarily expanded).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A glitch-free clock switching circuit with clock loss tolerance, comprising:
    a first stuck-status detection circuit, arranged to receive a first clock source and a reference clock signal, and perform a plurality of first stuck-status detection operations on the first clock source for detecting whether the first clock source is stopped toggling and stuck to a high voltage level or a low voltage level according to the reference clock signal to generate a plurality of first logic signals, wherein logic values of the plurality of first logic signals represent stuck-status detection results of the plurality of first stuck-status detection operations;
    a first reset synchronizer, coupled to the first stuck-status detection circuit, arranged to perform at least one first logic operation on the plurality of first logic signals to output a first synchronized reset signal responsively;
    a second stuck-status detection circuit, arranged to receive a second clock source and the reference clock signal, and perform a plurality of second stuck-status detection operations on the second clock source for detecting whether the second clock source is stopped toggling and stuck to the high voltage level or the low voltage level according to the reference clock signal to generate a plurality of second logic signals, wherein logic values of the plurality of second logic signals represent stuck-status detection results of the plurality of second stuck-status detection operations;
    a second reset synchronizer, coupled to the second stuck-status detection circuit, arranged to perform at least one second logic operation on the plurality of second logic signals to output a second synchronized reset signal responsively; and
    a glitch-free switching core circuit, coupled to the first reset synchronizer and the second reset synchronizer, arranged to perform clock switching according to a clock switching signal to switch an output clock of the glitch-free clock switching circuit from an original clock source to a target clock source, wherein the original clock source and the target clock source represent one of the first clock source and the second clock source and another of the first clock source and the second clock source, respectively;
    wherein the glitch-free clock switching circuit performs the clock switching based on the first synchronized reset signal and the second synchronized reset signal to provide the clock loss tolerance.

2. The glitch-free clock switching circuit of claim 1, wherein based on the first synchronized reset signal and the second synchronized reset signal, the glitch-free switching core circuit allows the clock switching to be performed correctly in a situation where the original clock source is lost.

3. The glitch-free clock switching circuit of claim 1, wherein the plurality of first stuck-status detection operations comprise a first logic 0 stuck-status detection operation and a first logic 1 stuck-status detection operation, and the plurality of first logic signals comprise two first logic signals; and the first stuck-status detection circuit comprises:
   a first logic 0 stuck-status detection sub-circuit, arranged to perform the first logic 0 stuck-status detection operation regarding the first clock source according to the reference clock signal to generate one logic signal among the two first logic signals, wherein a logic value of the one logic signal among the two first logic signals represents a stuck-status detection result of the first logic 0 stuck-status detection operation, for indicating whether the first clock source is stuck at a logic value 0 thereof; and
   a first logic 1 stuck-status detection sub-circuit, arranged to perform the first logic 1 stuck-status detection operation regarding the first clock source according to the reference clock signal to generate another logic signal among the two first logic signals, wherein a logic value of the other logic signal among the two first logic signals represents a stuck-status detection result of the first logic 1 stuck-status detection operation, for indicating whether the first clock source is stuck at a logic value 1 thereof.

4. The glitch-free clock switching circuit of claim 3, wherein the plurality of second stuck-status detection operations comprise a second logic 0 stuck-status detection operation and a second logic 1 stuck-status detection operation, and the plurality of second logic signals comprise two second logic signals; and the second stuck-status detection circuit comprises:
   a second logic 0 stuck-status detection sub-circuit, arranged to perform the second logic 0 stuck-status detection operation regarding the second clock source according to the reference clock signal to generate one logic signal among the two second logic signals, wherein a logic value of the one logic signal among the two second logic signals represents a stuck-status detection result of the second logic 0 stuck-status detection operation, for indicating whether the second clock source is stuck at a logic value 0 thereof; and
   a second logic 1 stuck-status detection sub-circuit, arranged to perform the second logic 1 stuck-status detection operation regarding the second clock source according to the reference clock signal to generate another logic signal among the two second logic signals, wherein a logic value of the other logic signal among the two second logic signals represents a stuck-status detection result of the second logic 1 stuck-status detection operation, for indicating whether the second clock source is stuck at a logic value 1 thereof.

5. The glitch-free clock switching circuit of claim 1, wherein the first reset synchronizer comprises:
   at least one first logic gate, arranged to perform the at least one first logic operation on the plurality of first logic signals to generate a first intermediate reset signal; and
   a plurality of first flip-flops, coupled to the at least one first logic gate, arranged to generate the first synchronized reset signal and output a logic value of the first synchronized reset signal responsively according to the first intermediate reset signal.

6. The glitch-free clock switching circuit of claim 5, wherein the second reset synchronizer comprises:
   at least one second logic gate, arranged to perform the at least one second logic operation on the plurality of second logic signals to generate a second intermediate reset signal; and
   a plurality of second flip-flops, coupled to the at least one second logic gate, arranged to generate the second synchronized reset signal and output a logic value of the second synchronized reset signal responsively according to the second intermediate reset signal.

7. The glitch-free clock switching circuit of claim 1, wherein the glitch-free switching core circuit comprises:
   a plurality of first flip-flops, receiving the first synchronized reset signal, arranged to selectively perform a reset operation according to the first clock source and the first synchronized reset signal; and
   a plurality of second flip-flops, receiving the second synchronized reset signal, arranged to selectively perform a reset operation according to the second clock source and the second synchronized reset signal.

8. A glitch-free clock switching device comprising:
   the glitch-free clock switching circuit of claim 1; and
   a plurality of additional glitch-free clock switching circuits, the plurality of additional glitch-free clock switching circuits and the glitch-free clock switching circuit being coupled to each other in a cascading manner, wherein the glitch-free clock switching device is arranged to perform clock switching on a plurality of clock signals, the plurality of clock signals comprise the first clock source and the second clock source, and respective circuit architectures of the plurality of additional glitch-free clock switching circuits are the same as a circuit architecture of the glitch-free clock switching circuit.

9. An operation method of a glitch-free clock switching circuit with clock loss tolerance, the operation method comprising:
   utilizing a first stuck-status detection circuit in the glitch-free clock switching circuit to receive a first clock source and a reference clock signal, and perform a plurality of first stuck-status detection operations on the first clock source for detecting whether the first clock source is stopped toggling and stuck to a high voltage level or a low voltage level according to the reference clock signal to generate a plurality of first logic signals, wherein logic values of the plurality of first logic signals represent stuck-status detection results of the plurality of first stuck-status detection operations;
   utilizing a first reset synchronizer in the glitch-free clock switching circuit to perform at least one first logic operation on the plurality of first logic signals to output a first synchronized reset signal responsively;
   utilizing a second stuck-status detection circuit in the glitch-free clock switching circuit to receive a second clock source and a reference clock signal, and perform a plurality of second stuck-status detection operations on the second clock source for detecting whether the second clock source is stopped toggling and stuck to the high voltage level or the low voltage level according to the reference clock signal to generate a plurality of second logic signals, wherein logic values of the plurality of second logic signals represent stuck-status detection results of the plurality of second stuck-status detection operations;
   utilizing a second reset synchronizer in the glitch-free clock switching circuit to perform at least one second logic operation on the plurality of second logic signals to output a second synchronized reset signal responsively; and utilizing a glitch-free switching core circuit in the glitch-free clock switching circuit to perform clock switching according to a clock switching signal to switch an output clock of the glitch-free clock switching circuit from an original clock source to a target clock source, wherein the original clock source and the target clock source represent one of the first clock source and the second clock source and another of the first clock source and the second clock source, respectively;

wherein the glitch-free clock switching circuit performs the clock switching based on the first synchronized reset signal and the second synchronized reset signal to provide the clock loss tolerance.

10. The operation method of claim 9, wherein based on the first synchronized reset signal and the second synchronized reset signal, the glitch-free switching core circuit allows the clock switching to be performed correctly in a situation where the original clock source is lost.

11. The operation method of claim 9, wherein the plurality of first stuck-status detection operations comprise a first logic 0 stuck-status detection operation and a first logic 1 stuck-status detection operation, and the plurality of first logic signals comprise two first logic signals; and utilizing the first stuck-status detection circuit in the glitch-free clock switching circuit to perform the plurality of first stuck-status detection operations on the first clock source according to the reference clock signal to generate the plurality of first logic signals further comprises:

utilizing a first logic 0 stuck-status detection sub-circuit in the first stuck-status detection circuit to perform the first logic 0 stuck-status detection operation regarding the first clock source according to the reference clock signal to generate one logic signal among the two first logic signals, wherein a logic value of the one logic signal among the two first logic signals represents a stuck-status detection result of the first logic 0 stuck-status detection operation, for indicating whether the first clock source is stuck at a logic value 0 thereof; and utilizing a first logic 1 stuck-status detection sub-circuit in the first stuck-status detection circuit to perform the first logic 1 stuck-status detection operation regarding the first clock source according to the reference clock signal to generate another logic signal among the two first logic signals, wherein a logic value of the other logic signal among the two first logic signals represents a stuck-status detection result of the first logic 1 stuck-status detection operation, for indicating whether the first clock source is stuck at a logic value 1 thereof.

12. The operation method of claim 11, wherein the plurality of second stuck-status detection operations comprise a second logic 0 stuck-status detection operation and a second logic 1 stuck-status detection operation, and the plurality of second logic signals comprise two second logic signals; and utilizing the second stuck-status detection circuit in the glitch-free clock switching circuit to perform the plurality of second stuck-status detection operations on the second clock source according to the reference clock signal to generate the plurality of second logic signals further comprises:

utilizing a second logic 0 stuck-status detection sub-circuit in the second stuck-status detection circuit to perform the second logic 0 stuck-status detection operation regarding the second clock source according to the reference clock signal to generate one logic signal among the two second logic signals, wherein a logic value of the one logic signal among the two second logic signals represents a stuck-status detection result of the second logic 0 stuck-status detection operation, for indicating whether the second clock source is stuck at a logic value 0 thereof; and utilizing a second logic 1 stuck-status detection sub-circuit in the second stuck-status detection circuit to perform the second logic 1 stuck-status detection operation regarding the second clock source according to the reference clock signal to generate another logic signal among the two second logic signals, wherein a logic value of the other logic signal among the two second logic signals represents a stuck-status detection result of the second logic 1 stuck-status detection operation, for indicating whether the second clock source is stuck at a logic value 1 thereof.

13. The operation method of claim 9, wherein utilizing the first reset synchronizer in the glitch-free clock switching circuit to perform the at least one first logic operation on the plurality of first logic signals to output the first synchronized reset signal responsively further comprises:

utilizing at least one first logic gate in the first reset synchronizer to perform the at least one first logic operation on the plurality of first logic signals to generate a first intermediate reset signal; and utilizing a plurality of first flip-flops in the first reset synchronizer to generate the first synchronized reset signal and output a logic value of the first synchronized reset signal responsively according to the first intermediate reset signal.

14. The operation method of claim 13, wherein utilizing the second reset synchronizer in the glitch-free clock switching circuit to perform the at least one second logic operation on the plurality of second logic signals to output the second synchronized reset signal responsively further comprises:

utilizing at least one second logic gate in the second reset synchronizer to perform the at least one second logic operation on the plurality of second logic signals to generate a second intermediate reset signal; and utilizing a plurality of second flip-flops in the second reset synchronizer to generate the second synchronized reset signal and output a logic value of the second synchronized reset signal responsively according to the second intermediate reset signal.

15. The operation method of claim 9, wherein utilizing the glitch-free switching core circuit in the glitch-free clock switching circuit to perform the clock switching according to the clock switching signal to switch the output clock of the glitch-free clock switching circuit from the original clock source to the target clock source further comprises:

utilizing a plurality of first flip-flops in the glitch-free switching core circuit to receive the first synchronized reset signal, and to perform a reset operation according to the first clock source and the first synchronized reset signal; and utilizing a plurality of second flip-flops in the glitch-free switching core circuit to receive the second synchronized reset signal, and to selectively perform a reset operation according to the second clock source and the second synchronized reset signal.

* * * * *